United States Patent

Bacon

[11] Patent Number: 5,984,388
[45] Date of Patent: *Nov. 16, 1999

[54] SECURING PACKAGES

[75] Inventor: Michael S. Bacon, Woking, United Kingdom

[73] Assignee: Entertainment UK Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,934

[22] Filed: Mar. 12, 1997

[30] Foreign Application Priority Data

Mar. 12, 1996 [GB] United Kingdom .................... 9605175

[51] Int. Cl.⁶ ......................................................... B65D 27/30
[52] U.S. Cl. ............... 292/307 R; 340/572; 24/DIG. 11; 206/387.11; 206/807
[58] Field of Search ........................... 292/307 R, 307 A; 340/572, 568, 571; 24/DIG. 11; 428/41.9; 70/57.1, 440, 439; 206/387.11, 807

[56] References Cited

U.S. PATENT DOCUMENTS

| | | | |
|---|---|---|---|
| 974,940 | 11/1910 | Whitehall | 292/307 A |
| 1,472,381 | 10/1923 | Bangs | 292/307 A |
| 1,618,282 | 2/1927 | Guiard | 292/307 A |
| 1,861,530 | 6/1932 | Hayden et al. | 24/DIG. 11 |
| 2,013,299 | 9/1935 | Byrne | 24/DIG. 11 |
| 2,096,352 | 10/1937 | Semonsen | 24/DIG. 11 |
| 2,360,325 | 10/1944 | Higbee | 292/307 R |
| 3,034,819 | 5/1962 | Tupper | 292/307 R |
| 3,463,532 | 8/1969 | Chidley | 292/307 R |
| 4,568,921 | 2/1986 | Pokalsky | 340/572 |
| 4,575,624 | 3/1986 | Klinkhardt | 340/572 X |
| 4,581,524 | 4/1986 | Hoekman et al. | 340/572 X |
| 4,710,754 | 12/1987 | Montean | 340/572 |
| 4,774,521 | 9/1988 | Okada et al. | 340/572 X |
| 4,945,339 | 7/1990 | Yamauchi et al. | 340/572 X |
| 5,081,445 | 1/1992 | Gill et al. | 340/572 |
| 5,081,446 | 1/1992 | Gill et al. | 340/572 |
| 5,285,191 | 2/1994 | Reeb | 340/572 |
| 5,541,577 | 7/1996 | Cooper et al. | 340/572 X |
| 5,551,729 | 9/1996 | Morgan . | |
| 5,560,970 | 10/1996 | Ludebuhl | 428/41.9 |
| 5,595,297 | 1/1997 | Borck et al. | 206/387.11 |
| 5,597,653 | 1/1997 | Ikeda et al. | 340/572 X |
| 5,699,047 | 12/1997 | Tsai et al. | 340/572 |
| 5,751,256 | 5/1998 | McDonough et al. | 340/572 |
| 5,777,884 | 7/1998 | Belka et al. | 206/387.11 |

FOREIGN PATENT DOCUMENTS

| | | | |
|---|---|---|---|
| 134404 | 3/1985 | European Pat. Off. | 340/572 |
| 673007 | 9/1995 | European Pat. Off. . | |
| 2141829 | 3/1973 | Germany | 340/572 |
| 4235042 | 4/1994 | Germany | 292/307 R |
| 4239846 | 6/1994 | Germany | 292/307 R |
| 58-24349 | 5/1983 | Japan | 292/307 R |
| 3-121598 | 5/1991 | Japan | 340/572 |
| 5-46093 | 2/1993 | Japan | 292/307 R |
| 6-186908 | 7/1994 | Japan | 292/307 R |
| 2290525 | 1/1996 | United Kingdom . | |
| 93/12513 | 6/1993 | WIPO . | |
| 94/28524 | 12/1994 | WIPO | 340/572 |

OTHER PUBLICATIONS

Esselte Meto Inegrated Retail Solutions.

Sensormatic Europe, The World Leader in Loss Prevention.

*Primary Examiner*—Darnell M. Boucher
*Attorney, Agent, or Firm*—Nixon & Vanderhye P.C.

[57] ABSTRACT

A substantially conventional case for a CD is secured by a security tag. The security tag is formed from sheet material having an adhesive surface which is secured to both the lid and the base of the case to retain the case closed and to secure the CD therein. A security device is secured to the adhesive security tag. This security device is an article surveillance device detectible by detectors provided in gangway structures at the exits of retail outlets.

16 Claims, 2 Drawing Sheets

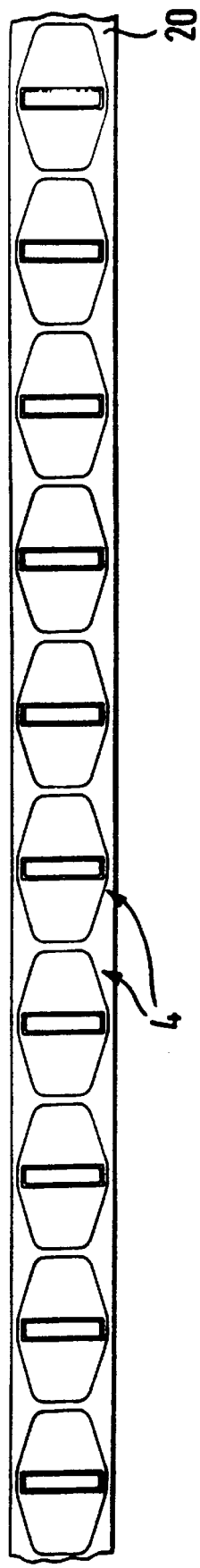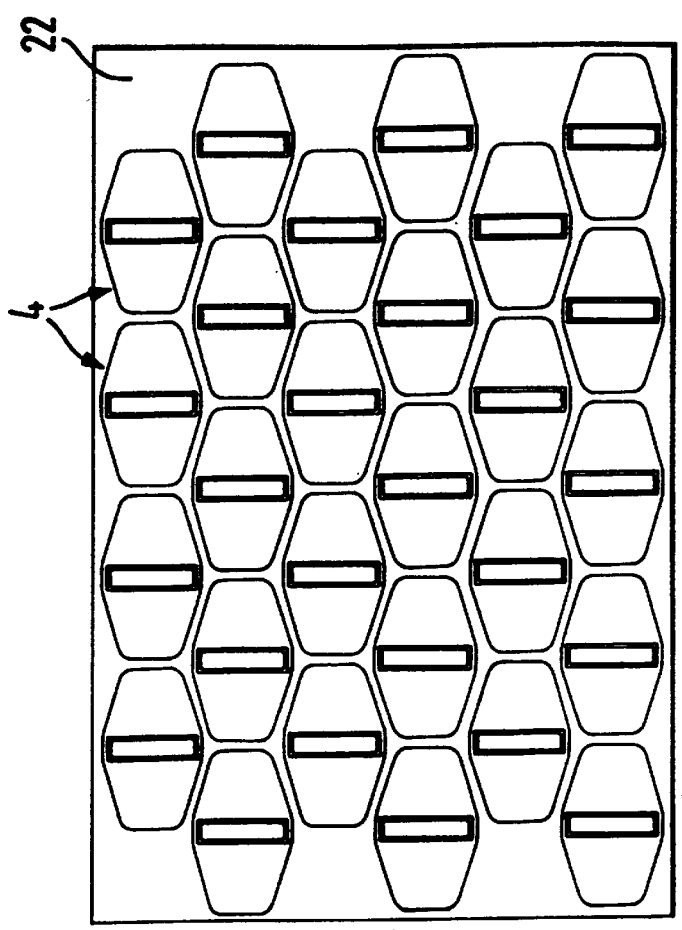

SECURING PACKAGES

BACKGROUND OF THE INVENTION

The present invention relates to a method of securing a package and its contents, and to a security tag for securing a package.

If products, such as CD's, are displayed in the case or pack provided in a retail store without security measures being taken they can be, and often are, stolen. Many large stores, therefore, affix to most or all of their products an externally detectible security device. When a product is purchased this security device is deactivated at the point of purchase. However, if an attempt is made to steal the product, detectors placed at exits to the premises sound an alarm.

Despite these precautions, it is still advisable to display CD's in their cases without further measures being taken as otherwise the CD is removed from the case which is left on display. Thus, retail outlets which use security devices which are externally detectible also shrink wrap the cases so that the contents cannot be removed. Thus, before each CD can be displayed for sale is has to be shrink wrapped, for example, in the store or by the suppliers, and then the security device, which is commonly an electromagnetic or an acousto magnetic tag, is applied.

In some retail operations, each CD is removed from its case and only the case is placed on display. As with shrink wrapping, this requires time from staff, either in the store or of the supplier, in preparing stock for display. Furthermore, where the CD has been removed, there can be difficulties on purchase in retrieving the correct CD for the buyer.

SUMMARY OF THE INVENTION

The present invention seeks to provide an improved method of security.

According to a first aspect of the present invention there is provided a method of securing a package and its contents, the method comprising the steps of adhering a security tag formed from sheet material to the package such that the security tag retains the package closed, said security tag simultaneously securing a security device to said package, said security device being detectible by external means.

The method of the invention enables products, such as CD's in their cases, to be secured in a manner which is easier and simpler for the retailer than has previously been the case. In an embodiment, the security tag is simply adhered to the CD case so that the case cannot be opened. Where the case comprises a container with a hinged lid, for example, the security tag is adhered to retain the lid in its closed position. Furthermore, the security tag also secures the security device to the CD case. Thus, only one operation is necessary to adhere the security tag to the package and this makes both the package and its contents more secure.

Preferably, adhesive is provided on one surface of the sheet material so that the security tag is adhesive. The security tag can then be adhered in part to the lid and in part to the rest of the CD case, for example, to retain it closed.

The adhesive surface of the security tag is used to simultaneously adhere the security device to said package.

The security device is detectible by any suitable external means, for example, by article surveillance devices, or by electrical, or magnetic means. The external means may comprise radio frequency, electromagnetic or acousto magnetic means. Preferably, the method further comprises the step of providing a detector for the security device at an exit.

The present invention also extends to a security tag for use in a method as defined above.

According to a further aspect of the present invention there is provided a security tag comprising an adhesive tag formed from sheet material and having adhesive on one surface thereof, and a security device which is detectible by external electrical or magnetic means, said security device being arranged to be secured to a package by the adhesive surface of said adhesive tag.

The security device may be, or may have a portion which is, sufficiently small and/or sufficiently flat to enable the security device to be secured by the adhesive tag.

Preferably, the security device is to be interposed between the security tag and a package on to which the security tag is to be adhered. In this manner, the security device is secured to the package. Whilst the adhesive tag and the security device may be separate elements of the security tag, it is generally preferred that the security device be attached to the adhesive tag. This attachment may be by the adhesive surface of the adhesive tag. Additionally and/or alternatively the adhesive tag and the security device may be made in one piece.

In an embodiment, a column of security tags as defined above may be provided on an elongate strip of material. In an embodiment, the elongate strip is wound on a reel, or fan-folded, to enhance the dispensing of individual security tags.

Additionally and/or alternatively, a plurality of rows and columns of security tags may be provided on a web of material for ease of storage and dispensing.

The present invention also extends to a package having a base and a lid which co-operate in a closed position to define an enclosed container, and a security tag formed from sheet material and having adhesive on one surface thereof, said security tag being adhered to both the base and the lid whereby it retains the container closed, the package further comprising a security device detectible by external means, said security device being secured to the container by the adhesive surface of said adhesive tag.

The security device may be, or may have a portion which is, sufficiently small and/or sufficiently flat to enable the security device to be secured by the adhesive tag.

Preferably, the security device is interposed between the security tag and the container. Whilst the adhesive tag and the security device may be separate elements of the security tag, it is generally preferred that the security device be attached to the adhesive tag. This attachment may be by the adhesive surface of the adhesive tag. Additionally and/or alternatively the adhesive tag and the security device may be made in one piece.

BRIEF DESCRIPTION OF THE DRAWINGS

Embodiments of the present invention will hereinafter be described, by way of example, with reference to the accompanying drawings in which:

FIG. 4 shows an elongate strip carrying a column of security tags, and FIG. 5 shows a web having security tags arranged thereon in rows and columns.

DESCRIPTION OF THE PREFERRED EMBODIMENTS

In the following description, the present invention is described with reference to the securing of a package containing a CD. However, it will be appreciated that the invention is not limited to CD packages and indeed, may be used for securing any package and its contents. However, the invention will find particular application to packages for CD's, audio tapes, and video tapes.

Figure 1:
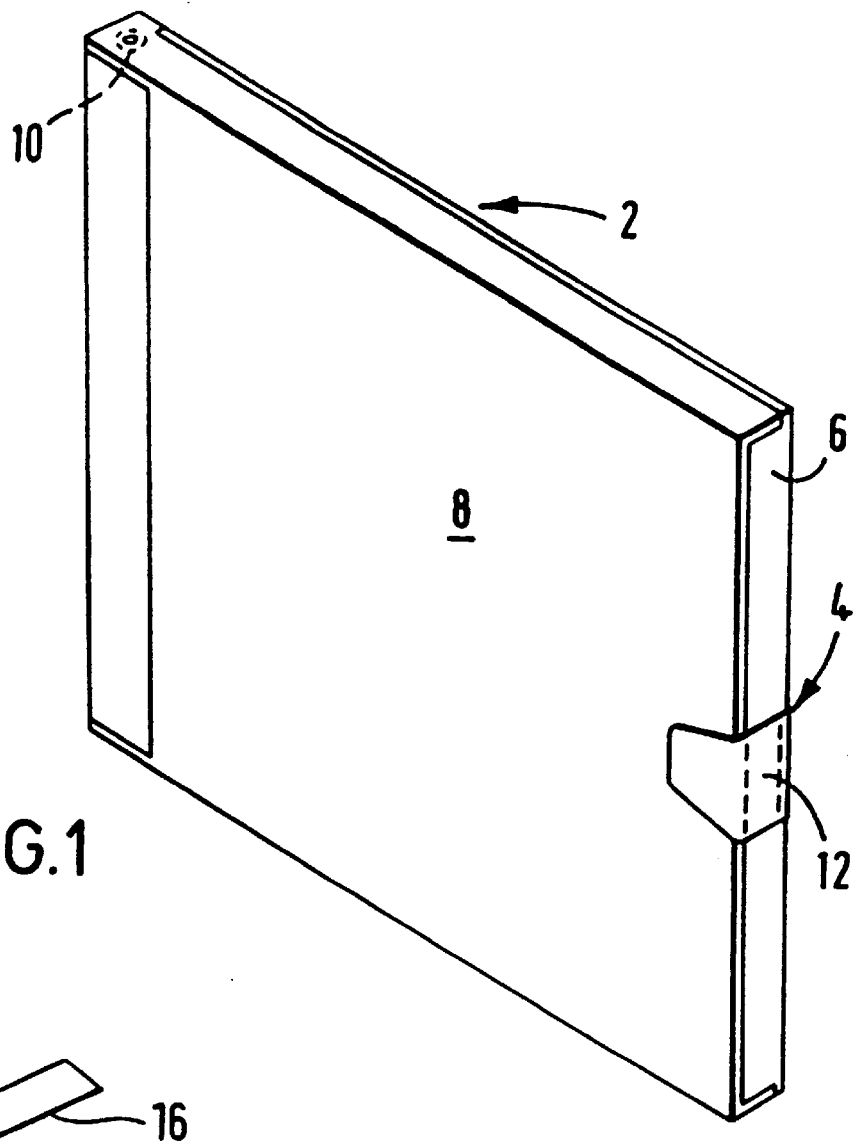
FIG. 1 shows a perspective view of a CD case secured by a security tag of the present invention.

FIG. 1 shows a perspective view of a substantially conventional case 2 for a CD which is secured by a security tag 4 of the present invention. In known manner, the case 2 has a base 6 to which a lid 8 is connected by way of a hinge 10. In the closed position of the lid 8, as illustrated, the CD is completely enclosed by the case 2 and access to the CD can only be obtained by opening the lid 8 about the hinge 10.

In the embodiment illustrated in FIG. 1, the CD case 2 is secured in it closed position by way of the security tag 4. In this respect, and as illustrated, the security tag 4 is formed from sheet material of which one surface is adhesive. This adhesive surface is secured to both the lid 8 and the base 6 of the case 2 such that the security tag 4 has to be removed before the lid 8 can be opened. The whole of the applied surface of the security tag 4, except for a spine portion 12, is adhered to the case 2. Furthermore, the security tag 4 is arranged to have rounded edges rather than corners. It is therefore difficult to remove the tag 4 without resort, for example, to scissors. Thus in a retail outlet, it is unlikely that any one would be able to remove the security tag 4, and hence the contents of the case 2, quickly and/or without being seen. Opportunist thieves will not, generally, try to remove the contents of a case 2 when secured as illustrated in FIG. 1.

Figure 2:
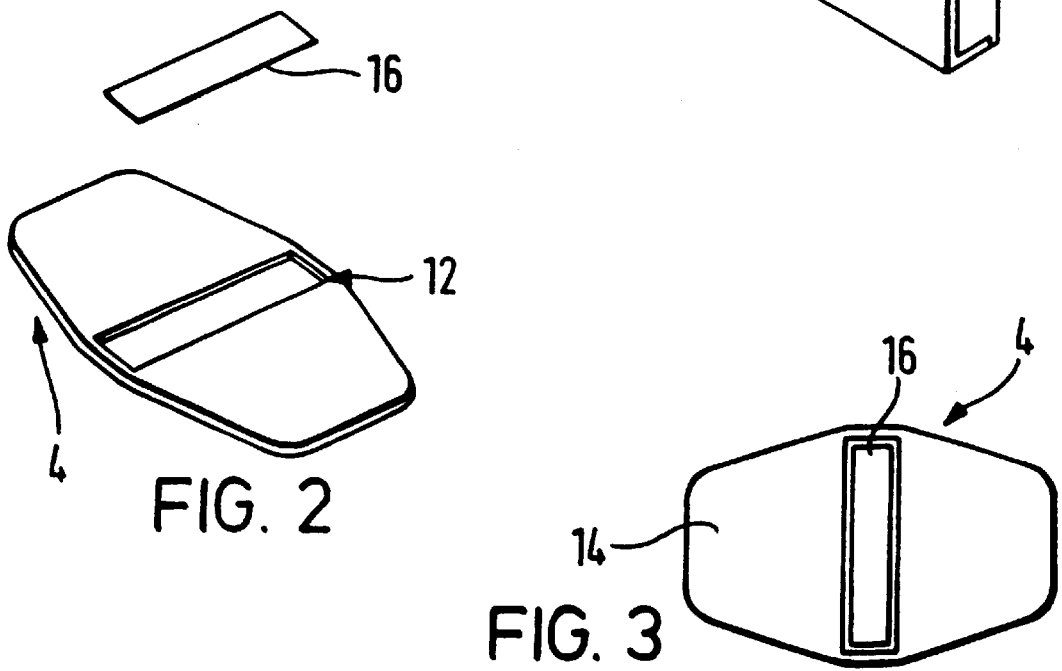
FIG. 2 is an exploded view illustrating the components of a security tag of the invention.
Figure 3:
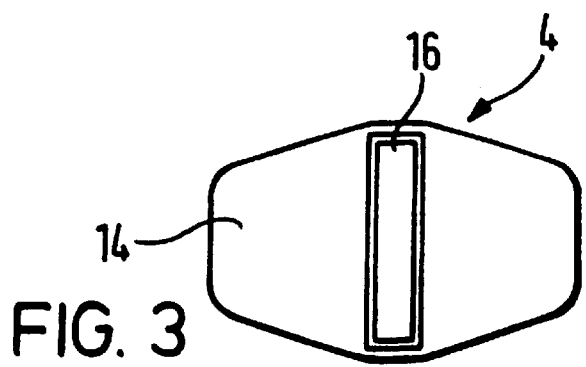
FIG. 3 shows an underneath view of a security tag of the invention.

FIGS. 2 and 3 show the construction of the security tag 4. As is clear from FIG. 2 the security tag 4 is formed of sheet material which has adhesive on one surface 14 thereof. At the spine region 12 thereof, a security device 16 is secured to the adhesive security tag 4. In this respect, the security device 16 may be secured simply by adherence to the adhesive surface. However, in the embodiment illustrated, the sheet material of the security tag 4 is formed with a recess to receive the security device 16. An underneath view of the security tag 4 with the security device 16 in position is shown in FIG. 3.

It will be appreciated that the security tag 4 is adhered to the CD case 2 so that the spine 12 of the tag 4, which carries the security device 16, is adjacent an edge or spine at an opening of the case 2, as is apparent in FIG. 1. However, in some instances it may not be possible or convenient for the security device 16 to be positioned along the edge or spine of the CD case. In such circumstance, the security device 16 may be arranged on a base or lid surface of the CD case with the remainder of the security tag 4 adhered across the opening of the case 2 to prevent opening of the lid 8.

A plurality of the security tags 4 may be arranged either in a single column on a strip 20 as shown in FIG. 4, or in a plurality of rows and columns on a web 22 as shown in FIG. 5. A protective sheet, not shown, may be provided to protect the adhesive surfaces of the security tags 4 until they are required for use. In either of the arrangements shown in FIGS. 4 and 5 the strip or web 20, 22 may be rolled on to a reel for easier dispensing of the tags when required. Generally, the strip 20 carrying the single column of tags 4 would be formed on a reel. Alternatively, the single column of tags 4, as shown in FIG. 4, may be fan-folded.

In use, each CD to be put on display in a retail outlet is secured in a closed case 2 by the application of a security tag 4 thereto. Not only does this secure the lid of the case to its base, it also affixes thereto the security device 16. This security device 16 may be any suitable externally detectible device. Currently, acousto magnetic security devices, or electromagnetic devices are available and can be detected by detectors provided in gangway structures at the exits of the retail outlets.

An example of a security device 16 is an acoustic-magnetic tag or label referred to as "Ultramax" and manufactured and sold by Sensormatic Limited, Dorney House, Upton Road, Slough, SL1 2AD, United Kingdom. With the Ultramax system, the detector at the exit continuously broadcasts a signal to create a detection field. The tag or label includes a strip of an alloy arranged to vibrate within the field. Such vibration is detected and is arranged to activate an alarm.

An alternative security device 16 may be an electromagnetic tag or a thin-film tag sold under the name Essette Meto and available from Meto UK Limited, 43 Western Road, Bracknell, Berks, RG12 1RH, United Kingdom.

Of course any present or proposed security devices may be used. The external means for detecting the security device may be any appropriate article surveillance device. Additionally and/or alternatively, the external means may comprise electrical or magnetic means. For example, the external means may comprise radio frequency, electromagnetic or acousto magnetic means.

It will be appreciated that modifications to and variations in the embodiments particularly described and illustrated may be made within the scope of this application.

I claim:

1. A method of securing a package, wherein the package comprises an openable and closable container including a lid displaceable relative to a remainder of said container so as to provide access to product disposed within the container, a juncture of the lid and the remainder of the container defining a seam, the method comprising the steps of:

providing a security tag comprising a sheet material having first and second opposed surfaces, and an adhesive provided on said first surface such that said security tag is an adhesive tag, and said security tag further comprising a security device including a structure that is detectable by at least one of an acoustic, a magnetic and an electronic assembly, so as to be detectable by a complementary detector independent of and remote from said security device, for detecting a prohibited transport of the security device, and adhering the adhesive provided on said first surface of said sheet material of said security tag to the container such that the sheet material of the security tag is adhered to said lid, traverses a portion of said seam and is adhered to said remainder of the container thereby to retain the container closed whereby the product is retained and secured in the container and removal of the product is substantially prohibited, and wherein the the step of adhering the adhesive provided on said first surface of said sheet material of said security tag comprises securing the sheet material of the security tag to said container with the security device disposed between said sheet material and said container, whereby said sheet material of said security tag secures the security device of the security tag to the container, whereby prohibited transport of the container bearing the security tag can be detected.

2. A method according to claim 1, wherein the complementary detector comprises an article surveillance device.

3. A method according to claim 1, wherein the complementary detector comprises one of a radio frequency, an electromagnetic, and an acoustic magnetic components.

4. A method according to claim 1, further comprising the steps of providing a said complementary detector for the security device at an exit from an area of authorized transport whereby prohibited transport out of said area can be detected.

5. An openable and closable package, in combination with a security tag formed from sheet material, the package comprising an openable and closable container including a lid displaceable relative to a remainder of said container so as to provide access to product disposed within the container, a juncture of the lid and the remainder of the container defining a seam, the security tag comprising a sheet material having first and second opposed surfaces, and an adhesive provided on said first surface such that said security tag is an adhesive tag, said adhesive provided on said surface of said sheet material being adhered to the container such that the sheet material of the security tag is adhered to said lid, traverses a portion of said seam and is adhered to said remainder of the container thereby to retain the container closed, whereby the product is retained and secured in the container and removal of the product is substantially prohibited, said security tag further comprising a security device including a structure that is detectable by at least one of an acoustic, a magnetic and an electronic apparatus, so as to be detectable by a complementary detector that is independent of and remote from said security device, for detecting a prohibited transport of the security device, wherein the security device is disposed between the sheet material of the security tag and the container, whereby said sheet material of said security tag secures the security device of the security tag to the container, whereby prohibited transport of the container bearing the security tag can be detected.

6. A package according to claim 5, wherein the security device is, or has a portion which is, sufficiently small and/or sufficiently flat to enable the security device to be secured by the adhesive tag.

7. A package according to claim 5, wherein the security device is attached to the adhesive tag.

8. The method of claim 1, wherein the container to which the sheet material of the security tag is adhered has first and second generally parallel major surfaces, said lid comprising one of said major surfaces, and at least four wall portions extending between said major surfaces, and wherein said adhering step comprises applying said sheet material so as to be adhered at one end to one of said major surfaces, adhered at the other end to the other of said major surfaces and to extend across a portion of one of said wall portions that extends therebetween, said security device being disposed in parallel to said one of said wall portions.

9. The method of claim 1, wherein said container to which the sheet material of the security tag is adhered has a base portion generally in the form of a first tray, said lid is generally in the form of a second tray, and the lid and the base portion are interconnected by way of a spine, and wherein when the container is closed the lid and the base portion define an edge portion spaced from and opposed to said spine, and wherein said sheet material is applied so as to be adhered at one end to said lid, adhered at the other end to said base portion and to extend across a portion of said edge portion.

10. The method of claim 9, wherein said sheet material and security device of the security tag are applied to the container such that said security device is oriented to extend along said edge portion.

11. The method of claim 1, comprising the step of disposing a multimedia product within the container before said adhering step.

12. The package of claim 5, wherein said container has first and second generally parallel major services, said lid comprising one of said major surfaces, and at least four wall portions extending between said major surfaces, and wherein said sheet material of said security tag is applied so as to be adhered at one end to one of said major surfaces, adhered at the other end to the other of said major surfaces and to extend across a portion of one of said wall portions that extend therebetween.

13. The package of claim 5, wherein said container has a base portion generally in the form of a first tray, said lid is generally in the form of a second tray, and the lid and the base portion are interconnected by way of a spine, and wherein when the container is closed the lid and the base portion define an edge portion spaced from and opposed to said spine, and wherein said sheet material of said security tag is applied so as to be adhered at one end to said lid, adhered at the other end to said base portion and to extend across a portion of said edge portion.

14. The package of claim 13, wherein said sheet material and security device of said security tag are applied such that said security device is oriented to extend along said edge portion.

15. The package of claim 5, wherein the product retained within the container is one of a CD, an audio tape, and a video tape.

16. The package of claim 5, in further combination with a complementary detector that comprises one of a radio frequency, an electromagnetic, and an acoustic magnetic components for detecting prohibited transport of the container bearing the security tag.

* * * * *